United States Patent
Ferreira et al.

(10) Patent No.: US 6,762,138 B2
(45) Date of Patent: Jul. 13, 2004

(54) WET-LAID NONWOVEN WEB FROM UNPULPED NATURAL FIBERS AND COMPOSITE CONTAINING SAME

(75) Inventors: Rui B. Ferreira, Broad Brook, CT (US); Joseph A. Rieger, Simsbury, CT (US)

(73) Assignee: Ahlstrom Windsor Locks LLC, Windsor Locks, CT (US)

( * ) Notice: Subject to any disclaimer, the term of this patent is extended or adjusted under 35 U.S.C. 154(b) by 19 days.

(21) Appl. No.: 09/341,635

(22) PCT Filed: Jan. 20, 1998

(86) PCT No.: PCT/US98/01191

§ 371 (c)(1),
(2), (4) Date: Jul. 14, 1999

(87) PCT Pub. No.: WO98/31626

PCT Pub. Date: Jul. 23, 1998

(65) Prior Publication Data

US 2002/0132548 A1 Sep. 19, 2002

Related U.S. Application Data

(60) Provisional application No. 60/036,200, filed on Jan. 27, 1997.

(51) Int. Cl.$^7$ ................................................. D04H 1/00
(52) U.S. Cl. ........................ 442/327; 442/416; 442/408; 162/148
(58) Field of Search ................................ 442/327, 408, 442/416; 162/148

(56) References Cited

U.S. PATENT DOCUMENTS

| | | | | |
|---|---|---|---|---|
| 1,958,045 A | * | 5/1934 | Richter ............................ | 2/70 |
| 4,319,956 A | | 3/1982 | Snyder et al. | |
| 4,418,031 A | * | 11/1983 | Doerer et al. ................ | 264/241 |
| 5,009,747 A | * | 4/1991 | Viazmensky et al. ........ | 162/115 |
| 5,151,320 A | | 9/1992 | Homonoff et al. ........... | 428/284 |
| 5,253,397 A | | 10/1993 | Neveu et al. | |
| 5,399,422 A | * | 3/1995 | Dijkema et al. ............... | 442/36 |
| 5,437,919 A | | 8/1995 | Welich et al. ............... | 428/245 |
| 5,514,429 A | | 5/1996 | Kamihgaraguchi et al. ............................ | 428/34.2 |
| 5,958,186 A | * | 9/1999 | Holm et al. ................. | 162/108 |
| 6,163,943 A | * | 12/2000 | Johansson et al. ........... | 162/115 |

FOREIGN PATENT DOCUMENTS

| | | | |
|---|---|---|---|
| EP | 0908303 A2 | * | 7/1998 |
| GB | 2 102 037 A | | 1/1983 |
| GB | 2 209 352 A | | 5/1989 |
| JP | 01072836 | | 3/1989 |
| JP | 11241291 | | 9/1999 |
| SE | WO-93/12849 | * | 5/1996 |
| WO | WO 94/02674 | | 2/1994 |
| WO | WO 96/05347 | | 2/1996 |
| WO | WO 99/02335 | * | 1/1999 |

OTHER PUBLICATIONS

International Search Report for International Application No. PCT/US98/01191.
European Patent Office—Supplementary European Search Report; Application No. EP 98 90 3636; SIX (6) pages.

* cited by examiner

Primary Examiner—Elizabeth M. Cole
Assistant Examiner—Norca L. Torres
(74) Attorney, Agent, or Firm—Alix, Yale & Ristas, LLP

(57) ABSTRACT

Wet-laid nonwoven webs having mechanical reinforcement properties are provided by employing unpulped vegetable fiber bundles as the predominant fiber component. The unpulped fiber bundles have a modulus of elasticity of about $2-5 \times 10^6$ psi and a chopped fiber length of about 25 mm. The fibers are cordage fibers including sisal, abaca, henequen, kenaf and jute. Composites of the unpulped fiber webs with cellulosic and spunbonded sheets find application as thermoformed vehicle interior trim products.

17 Claims, No Drawings

WET-LAID NONWOVEN WEB FROM UNPULPED NATURAL FIBERS AND COMPOSITE CONTAINING SAME

RELATED APPLICATIONS

This application claims the benefit of U.S. Provisional Application No. 60/036,200, filed January 27, 1997. This is the U.S. national stage of International Application No. PCT/US98/00191 filed Jan. 20, 1998.

FIELD OF THE INVENTION

The present invention relates generally to wet-laid nonwoven webs made from unpulped long natural fiber bundles and to hydroentangled composite sheet material containing such nonwoven webs.

BACKGROUND OF THE INVENTION

In conventional wet-laid papermaking operations, pulped fibers are dispersed in an aqueous medium and deposited in sheet form on a paperforming wire or screen. The pulped fibers are the natural single elementary fiber units obtained from the pulping process. These elementary fibers, prior to the pulping process, are bundled together and held by several natural binding components such as lignin and hemicellulose. The pulping process removes these binding components, leaving behind mostly the elementary cellulosic fibers. This breakdown of the fiber bundles is desirable since the freed elementary fibers are more manageable and provide a desired sheet uniformity while contributing to the strength and brightness of the resultant sheet material.

In wet-laid nonwoven application, pulped vegetable fibers of increased length are employed as compared to the shorter wood pulp fibers. These long vegetable fibers impart improved mechanical properties and include elementary fibers such as sisal, hemp, caroa, flax, jute and abaca fibers, as mentioned in Homonoff et al U.S. Pat. No. 5,151,320 and Viazmensky et al U.S. Pat. No. 5,009,747. In this connection, the pulped vegetable fibers typically have a fiber diameter of about 5–30 $\mu$m and a fiber length of about 10 mm. In publication WO 96,12849, freed or pulped ramie fibers cut to a length of 12 mm have been used in place of 12 mm synthetic fibers to form absorbent nonwovens when appropriate dispersion agents are employed.

Wet-laid nonwovens of inorganic fibers such as glass, carbon, silica carbide and others also are known and have been used for composite applications where the anisotropic properties of the wet-laid nonwoven are desirable for reinforcement purposes. These inorganic fibers advantageously impart to the nonwovens their high modulus of elasticity, which result in improved reinforcement at a minimal weight penalty.

Interior headliners for motor vehicles heretofore have consisted of moldable multi-layer assemblies comprised of a foam core with layers of fiberglass adhered to opposite planar surfaces thereof. A plastic moisture barrier film such as a polyethylene film is applied to the backside fiberglass layer (the side closest to the vehicle roof) and paper fleeces are employed as cover layers over the film to prevent sticking during the molding operation. A cloth fabric or equivalent layer covers the front fiberglass layer closest to the interior of the vehicle. Additionally, as mentioned in the Welch et al U.S. Pat. No. 5,437,919, outside layers of woven jute fleece or flax or sisal fleece may be used. Such headliner materials exhibit not only the necessary thermoforming characteristics, but the fiberglass reinforcing fibers provide a modulus of elasticity exceeding that of the resin matrix and impart the requisite stiffness to the resultant product.

For various reasons, the industry seeks to obviate the use of fiberglass in such applications without adversely impacting on the desirable characteristics thereof, particularly the thermoforming and modulus or stiffness characteristics.

SUMMARY OF THE INVENTION

It has now been found, in accordance with the present invention, that desirable mechanical reinforcement properties can be incorporated into nonwoven web materials without using fiberglass or bulky, heavy weight materials that have evidenced nonuniform constructions hereinbefore. This is achieved by using wet-laid nonwoven webs made with long vegetable fiber bundles as the predominant fiber component. Such nonwoven webs may be used individually or as part of composite structures as the reinforcing or stiffening component of such composites.

It is an advantage of the present invention that the unpulped fiber bundles exhibit the requisite high modulus of elasticity necessary to replace the inorganic fibers employed heretofore. At the same time, the anisotropic characteristic of the wet-laid nonwoven material is maintained.

In accordance with the present invention, fiberglass mats can be replaced entirely by wet-laid sheets composed predominantly of natural long fibers having an equivalent or greater modulus of elasticity, i.e., stiffness, of about $2-5 \times 10^6$ pounds per square inch. A nonwoven web of natural long fiber bundles may be employed to replace both the fiberglass layer and the barrier film that prevents resin bleed-through. A composite thereof provides multiple layers of thermoplastic fibers, natural reinforcing fibers and woodpulp which, when combined, will withstand the thermoforming processes required where contoured reinforcement of the finished product is desired, such as in vehicle headliners or other vehicle interior trim products. The sheet material of the present invention completely replaces the inorganic reinforcing fibers and employs select unpulped natural long fiber bundles in a water-laid web. The long fiber web material may be used alone or as a composite to replace the prior three layered structure of fiberglass substrate, thermoplastic film and nonwoven backing. The resultant product combines lightweight, reduced bulk and high stiffness in molded form with good moldability and mold release as well as high elongation and barrier properties against resin flow.

Other features and advantages of the present invention will be in part obvious and in part pointed out more in detail hereinafter.

A better understanding of these advantages, features, properties and relationships of the invention will be obtained from the following detailed description which sets forth an illustrative embodiment and is indicative of the way in which the principles of the invention are employed.

DESCRIPTION OF A PREFERRED EMBODIMENT

The nonwoven fibrous web material formed in accordance with the invention is made by a wet papermaking process that involves the general steps of forming a fluid dispersion of the requisite fibers, depositing the dispersed fibers on a fiber collecting wire in the form of a continuous sheet-like web material. The fiber dispersion may incorporate up to 2% by weight, preferably about 1% by weight, of a wet strength additive and, following sheet formation, may be used as one component of a composite to provide the desired synergistic strength and modulus characteristics while facilitating use in moldable applications.

The fiber dispersion may be formed in a conventional manner using water as the dispersant or by employing other suitable liquid dispersing media. Preferably, aqueous dispersions are employed in accordance with known papermaking techniques and, accordingly, a fiber dispersion is formed as a dilute aqueous suspension or furnish of the fibers. The fiber furnish is then conveyed to the web-forming screen or wire, such as a Fourdriner wire of a papermaking machine, and the fibers are deposited on the wire to form a nonwoven fibrous web or sheet. The sheet or web is dried in a conventional manner, but is not treated with any postformation bonding agent.

The fiber furnish is a blend of natural pulp, man-made fibers and a predominant amount of unpulped natural fiber bundles. The pulp component of the fiber furnish can be selected from substantially any class of pulp and blends thereof. Preferably the pulp is characterized by being entirely natural cellulosic fibers and can include cotton as well as wood fibers, although softwood papermaking pulp, such as spruce, hemlock, cedar and pine are typically employed. Hardwood pulp and non-wood pulp, such as hemp and sisal may also be used. The natural pulp may constitute up to about 40 percent by weight of the total fiber content of the web material.

As mentioned, the nonwoven web material also may contain a significant concentration of man-made fibers blended with the wood pulp. The typical man-made fiber is a polyester such as polyethylene terepthalate. However, as will be appreciated, the synthetic fiber component is not limited to polyesters, but can include other synthetic and man-made fibers that are either non-cellulosic or cellulosic in nature. For example, cellulose acetate, viscose rayon, nylon or polyolefin fibers such as polypropylene fibers also may be used.

Although substantially all commercial papermaking machines, including rotary cylinder machines, may be used, it is desirable where very dilute fiber furnishes of long fiber material are employed to use an inclined fiber-collecting wire, such as that described in U.S. Pat. No. 2,045,095 issued to F. H. Osborne on Jun. 23, 1936. The fibers flowing from the headbox are retained on the wire in a random three-dimensional network or configuration with slight orientation in the machine direction while the aqueous dispersant quickly passes through the wire and is rapidly and effectively removed.

Synthetic fibers are preferably of a low denier of about 1–6 denier per filament (dpf) and a length greater than about 4 mm, for example, in the range of 10–25 mm. Generally, the lower denier materials are of slightly shorter length than the higher denier in view of the tendency of the lower denier fiber to entangle prior to deposition on the web forming screen. For example, 3 dpf fibers can be used at lengths of about 15 mm, while it is preferred to use a 1.5 dpf fiber at a length of about 10 mm and a 6 dpf fiber at a length of 25 mm. As will be appreciated, still longer fibers may be used where desired so long as they can be readily dispersed within the aqueous slurry of the other fibers. Although the amount of synthetic fibers used in the furnish may also vary depending upon the other components, it is generally preferred that less than 30 percent by weight be employed. Typically, the man-made content is at least 5 percent by weight, with 5–25 percent by weight and preferably 5–15 percent by weight being used in most cases.

In addition to the man-made fibers and the conventional papermaking fibers of bleached kraft, the furnish of the present invention includes unpulped natural fibers as the predominant component. As mentioned, some strength is imparted by the kraft fibers. However, the predominant reinforcement characteristics are achieved in accordance with the present invention by including long unpulped vegetable fibers and particularly the extremely long natural, unpulped fiber bundles of cordage fibers chopped to a length in the range of 10–50 mm. These very long natural fiber bundles supplement the strength characteristics provided by the bleach kraft and, at the same time, provide a natural toughness and burst strength.

The natural long hard cordage fibers are comprised of, but not limited to, sisal, abaca, henequen, kenaf and jute. These natural fiber bundles are used in their natural state with varying thickness and a length selected so that the bundles can be formed as an individual layer by the wet-laid process. The fibers are kept in their bundle configuration and contain the naturally occurring lignin, hemicellulose and other ingredients. As indicated, the bundles are not pulped. A comparison of the fiber diameters of pulped elemental fibers and the unpulped fiber bundles is set forth in Table I. The long natural fiber bundles typically comprise at least 30% by weight of the fiber content of the nonwoven material and are the predominant fiber component. The preferred range is 55–85% by weight, as contrasted with the range for pulp of 5–40%, with good results being obtained in the range of 60–75% by weight.

TABLE I

| Fiber | Unpulped Fiber Diameter ($\mu$m) | Unpulped Fiber Denier (g/9000 m) | Pulped Fiber Diameter ($\mu$m) |
|---|---|---|---|
| Sisal | 137 to 193 | 206 to 406 | 7 to 47 |
| Abaca | 113 to 158 | 139 to 273 | 10 to 32 |
| Henequen | 182 to 188 | 362 to 383 | — |
| Kenaf | 68 | 50 | 10 to 32 |
| Jute | 37 to 50 | 15 to 27 | 5 to 25 |

Although fiber bundle lengths up to 100 mm or more may be employed, the more typical longest fiber bundles utilized are about 50 mm or less in length. Products made from fibers having a length range of about 10–35 mm are preferable with commercial products frequently having a fiber bundle length of about 20–30 mm. It is of course appreciated that the fiber bundles can readily be chopped to any desired length and are not chemically pulped but used in their natural state.

As mentioned, the remaining fiber components in the long fiber web consist of woodpulp, synthetic fibers or mixtures thereof. These assist in the processing of the wet-laid web material and typically are present in lesser amounts. The preferred amount is about 10–20% each. When both pulp and synthetic fibers are present, they are in a ratio ranging from 1:5 to 5:1, with the preferred ratio being in the range of about 1:2.5 to 2.5:1. The synthetic fibers may be of one material, mixtures of synthetics, bicomponent fibers or binder fibers. Materials such as polyesters or polyolefins are typical.

The properties of the nonwoven are enhanced for use by the addition of a suitable binder or wet-strength agent. Suitable binders can include both the chemical binders such as acrylics, polyvinyl alcohols, vinyl acetates, styrene derivatives such as styrene butadiene rubbers, polyesters, and other traditional chemical binder families; as well as synthetic binder fibers. Synthetic binder fibers commonly used are the polyvinyl alcohols, and the many bicomponent temperature sensitive fibers such as polyolefin and polyesters. A suitable binder content can be in the range of 2 to 30 weight percent of final product, with the lower end of that range being preferred, such as about 3–10% with about 5% being most preferred. Binder addition is accomplished by the common chemical methods, wet-end additions, and thermal conditioning. In place of chemical binders, the webs may be hydroentangled.

The basis weight of the long fiber nonwoven web material may vary from about 50–80 g/m$^2$ to about 200 g/m$^2$ depending on the desired end use. The preferred material has a basis weight in excess of 100 g/m$^2$ and typically falls in the range of about 105–135 g/m$^2$ and more preferably about 120–130 g/m$^2$.

The composite multilayer materials made from the long natural fiber bundle webs are formed by combining a layer of such a nonwoven with a stretchable first layer of high content thermoplastics, such as fibers with a low melting point temperature, and a cover layer of high content wood pulp or other natural or synthetic heat resistant fibers. The composite can be formed by taking three individual and distinct layers, or a number of other layered combinations having the above-stated properties, and hydroentangling them together to form a single finished composite product. Other methods of combining the various layers include, but are not limited to needle punching, thermal point bonding, adhesive lamination, and multi-phase wet-laid forming.

Typically, the hydroentangling operation is carried out in the manner set forth in Homonoff et al U.S. Pat. No. 5,515,320 issued Sep. 29, 1992, the disclosure of which is incorporated herein by reference. While that patent relates to a fiber web having a significantly higher manmade fiber content, preferably within the range of 40–90 percent manmade fiber, the hydroentangling operation described therein can efficaciously be employed with the web material of the present invention. The hydroentanglement treatment entangles together the fibers forming the web in such a manner as to provide a total energy input that preferably is less than about 0.4 horsepower-hours per pound of web. The total energy required to treat the web can range from as low as 0.01 and typically falls within the range of 0.1–0.25 horse-power-hours per pound of web.

The preferred material for the high thermoplastic content first layer of the composite can be spunbonded sheets of all kinds, spunlaced material, or others, including meshes, all having elongation properties preferably of 15% or more in both planar directions. The preferred thermoplastics are low melting point polyolefins, such as polyethylene or polypropylene, but can include other materials depending on the thermoforming temperature requirements of the composite. Commercially available spunbond layers may be employed. These exhibit a basis weight of about 10–50 g/m$^2$ with 20 g/m$^2$ material being preferred. During the thermoforming process, the thermoplastic content of this layer will melt and behave as a resin matrix for the reinforcing natural fibers, and as a gluing agent to aid in adhesion to other molded part components of a headliner assembly.

A cover layer is placed on the opposite side of the long fiber web from the spunbond layer and is typically a high wood pulp content substrate such as a paper or nonwoven. Other fibers can be used in the cover layer if they are heat resistant during thermoforming conditions and are equally able to provide good mold release and resin flow barrier characteristics. Candidate fibers include, but are not limited to polyaramids and their pulps. The preferred method for fabricating this layer is the wet-laid process due to its formation qualities and the ability to control porosity.

Once the wet-laid fiber bundle sheet has been formed on the paper machine, it may be layered with the spunbond substrates as the bottom sheet and the high wood pulp nonwoven as the top or cover sheet and the composite hydroentangled.

A following sandwich or composite configuration of a natural fiber bundle layer between the two confining layers readily may be used for replacing the current glass/film/nonwoven laminates.

1. Spunbond (or spunlace) of low melting point thermoplastic e.g., polypropylene or polyethylene
2. Chopped natural fiber bundles (with or without other fibers)
3. Wet-laid pulp: cellulose/PET, etc.

The central layer is of substantially greater stiffness, bulk and weight than the enclosing covering layers. The spunbonded layer provides elongation and gluing to other layers in the composite while the wet-laid cellulose covering provides barrier properties and good mold release characteristics.

Having generally described the invention, the following examples are included for purposes of illustration so that the invention may be more readily understood and are in no way intended to limit the scope of the invention unless otherwise specifically indicated. All amounts are on a weight basis unless otherwise specified.

EXAMPLE 1

A series of hand sheets was made using a Williams-type laboratory sheet mold. The fiber furnish consisted of 80% unpulped long vegetable fibers, 15% softwood pulp and 5% polyvinyl alcohol fibers having a length of 4 mm and a denier of 1 dpf (sold by Kuraray Co., Ltd. under the trade name VPB 105-2). The long unpulped vegetable fibers used were Ecuadorian abaca, East Africa sisal, Chinese kenaf and Belgian flax. The lengths of the chopped fiber bundles are set forth in Table II. Ten (10) hand sheets of each vegetable fiber type were made at a final sheet basis weight of 100 g/m$^2$. These hand sheets were in turn used as reinforcements on each side of a semi-rigid polyurethane foam core, commercially available from Foamex International, Inc., having a size of 250 mm×250 mm×6.5 mm and a foam density of 30.4 Kg/m$^3$. The foam hand sheet sandwich construction was glued employing a polyurethane adhesive, Reichold #2U010, and catalyzed on a 10:1 ratio using Reichold #22014. A target of 40 g/m$^2$ of adhesive was applied on each side of the foam with the glue being applied with a hand roller and the catalyst with a spray bottle. As an outer layer to the reinforcing hand sheets, a mold release paper of cellulose fibers having a basis weight of 22 g/m$^2$ was used. In all sandwich constructions, the release paper on each side became part of the final composite.

The sandwich composites were heat pressed at 290° F. for 50 seconds to a final thickness of 5 mm using a laboratory platen press, Model #Q-230C made by Pasadena Hydraulics, Inc. As a control comparison foam core sandwich samples were also produced with the reinforcement sheet being a fiberglass mat having a basis weight of 88 g/m$^2$.

The finished foam core sandwich samples were cut to provide ten (10) test specimens per fiber type. These specimens were tested for composite stiffness following the standard procedure per ASTM D790-96a. This is a three point flexural test that measures the force to produce a specimen deflection of 0.25 inches at its mid-span. The span between the sample supports was held constant as was the span to depth ratio.

Table II presents a summary of the measured test properties for the foam core sandwiches. The data clearly shows that unpulped vegetable fibers are a suitable substitute for glass fibers in these types of foam core sandwich composite structures, typically used in automotive headliners. As a minimum requirement a deflection force of 10N (2.25 lb$_f$) is typically specified for automotive headliners. All the composites incorporating the natural fiber bundle wet-laid nonwoven hand sheets exceed that minimum. Other applications for the long natural fiber wet-laid nonwoven can be envisioned in areas where fiberglass reinforcements are used, such as in construction applications, wall covering, plastic moldings, and others.

TABLE II

| Fiber Type | Fiber Length (mm) | Avg. Adhesive Weight (g) | Avg. Deflection Force (lb$_f$) | Modulus of Elasticity (psi) |
|---|---|---|---|---|
| Sisal | 22 | 6.29 | 4.51 ± 0.80 | 42,508 |
| Abaca | 25 | 6.58 | 4.26 ± 0.56 | 40,091 |
| Kenaf | 25 | 7.35 | 3.36 ± 1.18 | 31,595 |
| Flax | 13 | 7.26 | 3.11 ± 0.64 | 29,305 |
| Glass | 51 | 7.39 | 2.61 ± 0.50 | 24,595 |

EXAMPLE 2

This example shows that chemical binders can be used to bond the long natural fiber wet-laid nonwoven, instead of the binder fibers of Example 1.

A wet-laid nonwoven was formed with a fiber furnish consisting of 65% unpulped sisal fiber chopped to a length of 22 mm, 10% 18 mm×1.5 denier polyester fiber, and 25% flash dried wood pulp. The web was formed on an inclined wire papermaking machine resulting in a material having a basis weight of 123 g/m$^2$. The formed nonwoven web was transferred from the forming wire, dried and a liquid binder was applied by a two-sided spray station. The binder used was ethylene vinyl acetate (EVA), (Vinnapas 426, available from Wacker-Chemie GmbH). The spray solution was at 6% solids of EVA, and binder pick-up by the web was 6.5 g/m$^2$, for a final nonwoven basis weight of 130 g/m$^2$. The properties of the nonwoven are set forth in Table III.

EXAMPLE 3

This example shows that by employing the same forming and bonding conditions as in the above example, other fiber furnish compositions can be used to impart different properties to the wet-laid nonwoven.

In this example, the fiber composition employed was 70% of 22 mm chopped unpulped sisal fiber, 10% of polyethylene/polypropylene 5 mm×2.2 denier fiber, (type Herculon T-410 from FiberVisions) and 20% of flash dried wood pulp. The same EVA binder as Example 2 was used at the same weight level to achieve a final web basis weight of 130 g/m$^2$. Table III provides the physical properties of this web for comparison with the web from Example 2.

TABLE III

|  | Example 2 | Example 3 |
|---|---|---|
| Basis weight (g/m$^2$) | 128.9 | 131.7 |
| MD Tensile (N/m) | 1436 | 942 |
| CD Tensile (N/m) | 709 | 491 |

TABLE III-continued

|  | Example 2 | Example 3 |
|---|---|---|
| Thickness (μm) | 1382 | 1405 |
| Density (kg/m$^3$) | 93 | 94 |
| MD Elongation (%) | 4.5 | 2.9 |
| CD Elongation (%) | 7.7 | 4.7 |

EXAMPLE 4

Various examples of hydroentangled composites incorporating the long natural fiber wet-laid nonwoven as the middle layer of a three layer composite are listed below. The composites were hydroentangled at a line speed of about 35 ft./min. Four entangling units, each having 51 holes/in. and 92 μm-hole size direct water jets against the top cellulose layer to achieve the desired hydroentangled effect. The cellulose fibers upon impact by the water jets are pushed into the middle and bottom layers, providing satisfactory mechanical bonding.

| Sample | Composition of Layers |
|---|---|
| A Top: | 31 g/m$^2$: 65% cellulose pulp, 35% 18-mm PET (no binder) |
| Middle: | 80 g/m$^2$: 40% unpulped sisal, 20% unpulped abaca, 10% softwood, 10% PE pulp, 20% 20-mm PET (no binder) |
| Bottom: | 20 g/m$^2$: 18% point-bonded polypropylene spunbond |
| B Top: | 31 g/m$^2$: 65% cellulose pulp, 35% 18-mm PET (no binder) |
| Middle: | 80 g/m$^2$: 40% unpulped sisal, 20% unpulped abaca, 10% softwood, 10% PE pulp, 20% 20-mm PET (no binder) |
| Bottom: | 10 g/m$^2$: calendered polypropylene spunbond |
| C Top: | 40 g/m$^2$: 65% cellulose pulp, 35% 18-mm PET (no binder) |
| Middle: | 60 g/m$^2$: 60% unpulped sisal, 10% softwood, 10% PE pulp, 20% 20-mm PET (no binder) |
| Bottom: | 20 g/m$^2$: 18% point-bonded polypropylene spunbond |
| D Top: | 31 g/m$^2$: 65% cellulose pulp, 35% 18-mm PET (no binder) |
| Middle: | 60 g/m$^2$: 60% unpulped sisal, 20% softwood, 20% 20-mm PET (no binder) |
| Bottom: | 30 g/m$^2$: calendered polyethylene spunbond |

The properties of the resultant composites are listed in Table IV.

TABLE IV

| Sample | A | B | C | D |
|---|---|---|---|---|
| Basis Weight (g/m$^2$) | 133 | 108 | 127 | 114 |
| Dry MD Tensile (g/25 mm) | 2683 | 1755 | 3318 | 1374 |
| Dry CD Tensile (g/25 mm) | 1290 | 556 | 692 | 608 |
| Dry MD Elongation (%) | 22.3 | 18.6 | 28.6 | 10 |
| Dry CD Elongation (%) | 38.6 | 39.1 | 11.4 | 17.6 |
| Dry MD Toughness (G cm/cm$^2$) | 326 | 174 | 343 | 65 |
| Dry CD Toughness (g cm/cm$^2$) | 186 | 94 | 35 | 36 |
| Mullen Burst g/m$^2$) | 3780 | 1634 | 2669 | 1200 |

EXAMPLE 5

Long natural fiber bundle wet-laid webs were prepared on pilot and commercial equipment and were tested as substitutes for glass fiber mats in a vehicle headliner structures. The natural fiber mats were employed in various combinations as either single ply resin bonded structures or as multi-layer composites. Four such samples are set forth below as samples A–D and the physical data thereon is tabulated in Table V.

Sample A—Composite-Hydroentangled
   Top: 35 g/m² cellulose/PET
   Middle: 110 g/m² unpulped sisal/polypropylene/cellulose
   Bottom: 20 g/m² polypropylene Sample B—Composite:
   Top: 35 g/m² cellulose/PET
   Middle: 22 g/m² polyethylene film
   Bottom: 130 g/m² unpulped sisal/PET/cellulose Sample C—Single Ply:
   125 g/m² unpulped sisal/PET/cellulose, 15%–20% EVA Binder Sample D—Single Ply:
   135 g/m² unpulped sisal/PET/cellulose, 4% Binder Fiber

TABLE V

| Sample | A | B | C | D |
|---|---|---|---|---|
| Basis Weight (g/m²) | 168 | 185 | 127 | 135 |
| Dry MD Tensile (g/25 mm) | 3120 | 13200 | 6590 | 1135 |
| Dry CD Tensile (g/25 mm) | 1460 | 4950 | 2870 | 495 |
| Grain (CD/MD) | 0.47 | 0.375 | 0.436 | 0.436 |
| Dry MD Elongation (%) | 20.1 | 17.2 | 12.8 | 2.2 |
| Dry CD Elongation (%) | 39.1 | 18.8 | 23.6 | 7.9 |
| Mullen Burst (g/m²) | 3100 | — | 4060 | 790 |
| Sisal Content (g/m²) | ~65 | ~65 | ~65 | ~93 |

The samples were used in the front side (adjacent the face fabric)/back side combinations indicated in Table VI and were molded into a vehicle headliner configuration. The mold temperature employed was 143° C. and the dwell time was 50 sec. All samples exhibited good mold release, satisfactory bleed through protection and adequate stiffness and all passed a humidity test at a relative humidity of 95% at 38° C. for 100 hours.

TABLE VII

| Headliner Trial | 1 | 2 | 3 | 4 | 5 | 6 |
|---|---|---|---|---|---|---|
| Front Side Layer Nonwoven Sample | C | C | C | D | D | D |
| Back Side Layer Nonwoven Sample | C | B | A | B | D | A |
| Total Sisal Content, (g/m²) (Front and Back) | 130 | 130 | 130 | 158 | 186 | 158 |
| Total Nonwoven Weight, (g/m²) (Front and Back) | 254 | 312 | 295 | 320 | 270 | 303 |
| Transverse Strength, MD (N) | 18.4 | 19.3 | 13.9 | 18.5 | 19.8 | 14.5 |
| Transverse Strength, CD (N) | 8.8 | 9.2 | 10.1 | 9.2 | 13.6 | 11.0 |
| Geometric Mean Transverse Strength | 12.7 | 13.3 | 11.8 | 13.0 | 16.4 | 12.6 |

The elongation properties of Sample A permit its use for deep draw molding configurations, primarily due to its hydroentangled structure. On the front side, the high binder content of Sample C caused it to wrinkle and the wrinkles tended to "read through" the fabric. Therefore, Trial 6 is preferred for deep draw molds.

As will be apparent to persons skilled in the art, various modifications and adaptations of the structure above described will become readily apparent without departure from the spirit and scope of the invention, the scope of which is defined in the appended claims.

We claim:

1. A wet-laid nonwoven web material comprising a predominant amount of unpulped long natural fiber bundles and a pulp fiber component, wherein the unpulped tong natural fiber bundles are comprised of a plurality of elementary fibers substantially joined by natural binding agents.

2. The nonwoven web material of claim 1 wherein the natural fiber bundles are cordage fibers.

3. The nonwoven web material of claim 1 wherein the natural fiber bundles are selected from sisal, abaca, henequen, kenaf and jute.

4. The nonwoven web material of claim 1 wherein the long natural fiber bundles have a chopped fiber length in the range of 10–50 mm.

5. The nonwoven web material of claim 1 wherein the web has a basis weight of about 60 g/m² to about 160 g/m².

6. The nonwoven web material of claim 1 comprising a synthetic fiber component.

7. The nonwoven web material of claim 6 wherein the synthetic fiber component is selected from cellulose acetate, viscose rayon, nylon and polyolefin fibers.

8. The nonwoven web material of claim 1 wherein the web has a basis weight up to about 200 g/m².

9. The nonwoven web material of claim 1 wherein the web has a basis weight of at least about 100 g/m².

10. The nonwoven web material of claim 1 wherein the unpulped fibers have a modulus of elasticity in the range of about $2–5 \times 10^6$ psi.

11. A composite multi layer sheet material comprising a wet-laid nonwoven fibrous web material wherein the dominant fiber component is unpulped long natural fiber bundles and a pulp web secured thereto.

12. The composite sheet material of claim 11 wherein the layers are secured by hydroentanglement.

13. The composite sheet material of claim 11 wherein the layers are secured by chemical bonding.

14. The composite sheet material of claim 11 including a spunbonded web on the opposite side of the nonwoven from the pulp web.

15. The composite sheet material of claim 11 wherein the composite is thermoformable under pressure.

16. The composite sheet material of claim 11 including a foam layer with the nonwoven web material of claim 5 secured to opposite sides thereof.

17. The composite sheet material of claim 11 having an average deflection force of at least 2.25 $lb_f$.

* * * * *